Patented June 26, 1945

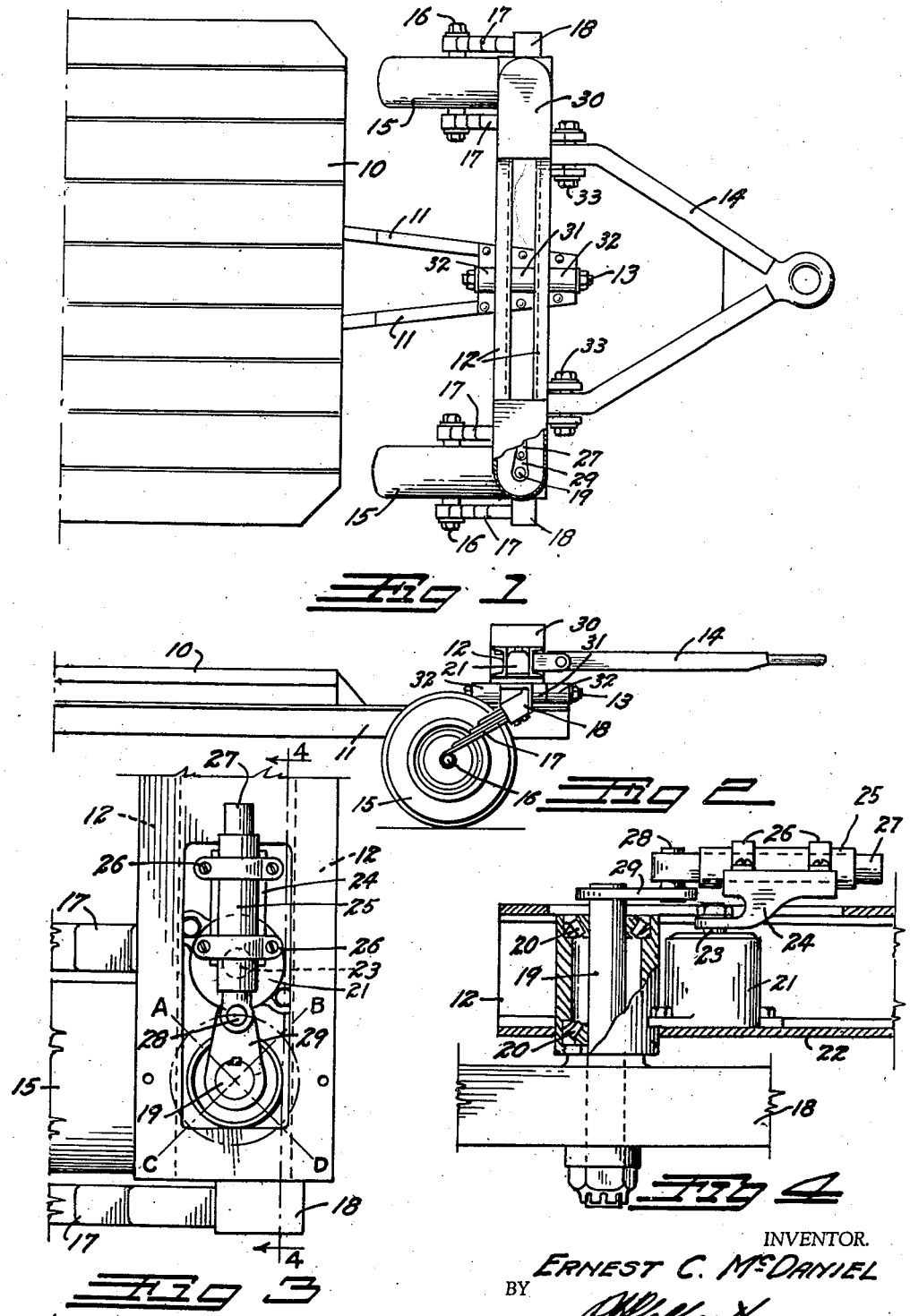

2,379,170

UNITED STATES PATENT OFFICE 2,379,170

FRONT TRUCK FOR TRAILERS

Ernest C. McDaniel, Denver, Colo.

Application May 4, 1943, Serial No. 485,675

10 Claims. (Cl. 280—33.4)

This invention relates to a front wheel truck for supporting the forward extremity of a vehicle such as a trailer. It is more particularly designed as an improvement over the trailer dolly illustrated and described in applicant's copending application, Serial No. 464,405, now Patent No. 2,350,624, issued June 6, 1944.

It has been heretofore exceedingly difficult to handle four wheel trailers, or trailers having front wheels or trucks of the caster type, due to the fact that the front wheels will whip or swing laterally when traveling at high speeds thus imparting a dangerous whipping action to the trailer. If these wheels are locked so that they cannot swing laterally, it is impossible for the front wheels to follow the path of the tow car.

The principal object of this invention is to provide means which will prevent whipping or swinging of front caster wheels at all road speeds and yet which will allow these wheels to follow all movements of the tow car.

Braking devices have been provided to prevent swinging of front trailer wheels but these devices make it exceedingly difficult to move or position the truck by hand, and interfere with backing or parking operations. Another object of this invention is to provide an anti-whipping device which will not interfere in any way with the hand manipulation of the truck or backing or parking the trailer.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all view of the drawing and throughout the description.

In the drawing:

Fig. 1 is a plan view of the forward portion of a typical trailer with the improved dolly or truck applied thereto;

Fig. 2 is a side view of the truck of Fig. 1;

Fig. 3 is an enlarged, detail, plan view of the improved wheel control device of the truck with the cover housing thereof removed; and Fig. 4 is a similarly enlarged section, taken on the line 4—4, Fig. 3, illustrating the detail construction of the wheel pivots and control devices.

In Fig. 1, a typical trailer platform is illustrated at 10 having forwardly projecting mounting beams 11. Two channel beams 12 extend across the mounting beams 11 and are secured thereto upon a longitudinal hinge pin 13 to form the front truck frame. This construction allows free relative lateral tilting between the trailer platform 10 and the truck frame. The truck frame is provided with a suitable towing tongue member 14 of any desired design for attachment to the tow vehicle.

The dolly frame is supported upon ground engaging wheels 15. It is to the novel mounting or connection between these wheels and the truck frame that this invention relates.

Each of the wheels is mounted upon an axle 16 extending between a pair of cantilever springs 17. Each pair of springs 17 is secured to and extends rearwardly and downwardly from a wheel frame member 18. Each of the wheel frame members is mounted on a vertical pivot shaft 19. The pivot shafts 19 are journalled in suitable anti-friction bearings 20 at each extremity of the truck frame 12. This mounting gives a caster effect to the wheels so that they are free to rotate about the pivot shafts 19 to follow the path of the tow car.

If no means were provided for snubbing this rotation about the wheel shafts, the wheels would develop a rapid and dangerous, back-and-forth, swinging action at high speeds. This is prevented in the present invention by means of suitable shock absorbers 21. These shock absorbers 21 themselves are of a standard automotive type known as two-way hydraulics, such as commonly known as "Hoo-dye absorbers." Such an absorber resists rapid movement of the absorber shaft in either of two directions but allows slow movement in either of these directions. The shaft of the absorber can be rotated through an arc of approximately 45° and will act to resist rapid movement in either direction at any point of the arc.

In the present invention, each absorber is mounted vertically on a mounting plate 22 secured between the channels 12 at each extremity thereof. The shafts of the absorbers are indicated at 23. A bracket arm 24 is fixedly mounted on each absorber shaft 23. The bracket arm is provided with a channel for receiving a slide cylinder 25 which is clamped in place therein by means of suitable clamping straps 26. A cylindrical plunger 27 freely slides within the slide cylinder 25. One extremity of this plunger is hingedly mounted on a hinge pin 28 projecting from the extremity of a crank lever 29 which in turn is fixedly secured to one of the pivot shafts 19. When in use, the control mechanism of each wheel is protected by a covered housing 30.

When the wheels are in their normal, straight-back, trailing position, the mechanism is in the position illustrated in Fig. 3. Any lateral movement of the wheel in either direction about the axis of the pivot shaft 19 will tend to swing the extremity of the plunger 27, one way or the other and since the plunger is mounted on the bracket arm 24, this tendency will be resisted by the absorber 21.

It is desired to call attention to the fact that when in this position the hinge pin 28 and the absorber shaft 23 are relatively close together so that a short leverage is provided on the absorber. Therefore the latter can readily resist extreme stresses tending to cause the wheels to whip or swing laterally. Should the tow car turn, however, the tendency to turn the wheels is applied slowly. The absorber will allow slow movement of the crank lever 29 so that the wheels may readily follow the new direction of the tow car and slowly return as the tow car resumes the straight-ahead position.

The lever 29 has four zones of operation in which it functions differently. These zones are approximately divided between lines A—D and B—C, in Fig. 3. Any tendency to vary from the straight-ahead, trailing position of Fig. 3 operates the lever 29 in the zone A—B where it has a short leverage on the absorber and great resistance. Should it be desired to push the forward extremity of the trailer to one side or the other to line it up for hand manipulation, the wheels will move into a plane lateral to the axis of the trailer and the lever 29 will move into either of the side zones A—C or B—D. When moving in these zones, the only result is to slide the plunger 27 back and forth in its cylinder 25 with very little or no rotation of the absorber shaft. Therefore hand manipulation is not interfered with.

In backing, the wheels will rotate through an arc of 180° and the lever 29 will swing into the zone C—D. This places the hinge pin 29 on a long lever arm about the absorber 21 so that there will be very little resistance to the turning of the wheels so that manipulation backward can be easily accomplished.

It is desired to call particular attention to the connection between the channel beams 12 and the mounting beams 11. A first hinge member 31 is rigidly secured to the bottom of the mounting beams and provides a bearing for the hinge pin 13 which maintains the latter rigidly parallel to the longitudinal center line of the trailer. A second hinge member 32 is rigidly secured to the channel beams 12 and extends upward to a journal mounting on the hinge pin 13 to maintain the beams 12 fixedly at right angles to the axis of the hinge pin. This allows the front truck to rock freely in a vertical plane but absolutely prevents horizontal rotation thereof. This allows the four wheels of the trailer to follow road irregularities without stressing the trailer frame and yet forces the entire trailer to swing to the side when the tongue member is turned in either direction.

While a specific form of the improvement has been described and illustrated herein, it is desired to be understood that the same may be varied, within the scope of the appended claims, without departing from the spirit of the invention.

Having thus described the invention what is claimed and desired secured by Letters Patent is:

1. A front wheel truck for trailers comprising: a transverse frame; a vertical pivot shaft at each extremity of said transverse frame; a caster wheel mounted on the lower extremity of each pivot shaft; a lever extending from each pivot shaft; a shock absorber connected to each of said levers to resist movement thereof; and means for causing said absorber to exert its maximum action when said wheels are in the straight ahead position.

2. A front wheel truck for trailers comprising: a transverse frame; a vertical pivot shaft at each extremity of said transverse frame; a caster wheel mounted on the lower extremity of each pivot shaft; a lever extending from each pivot shaft; a shock absorber vertically mounted adjacent each pivot shaft; a bracket member extending from the shaft of each shock absorber; and an operative connection between each of said bracket members and one of said levers so that relative movement of the latter will be more vigorously resisted by said absorbers when said wheels are in the straight ahead position than when in any other position.

3. A front wheel truck for trailers comprising: a transverse frame; a vertical pivot shaft at each extremity of said transverse frame; a caster wheel mounted on the lower extremity of each pivot shaft; a lever extending from each pivot shaft; a shock absorber vertically mounted adjacent each pivot shaft; a bracket member extending from the shaft of each shock absorber; a slide supported by each of said bracket members and extending radially of said absorber; a slide rod mounted in said slide; and a hinged connection between each of said slide rods and one of said levers so that rotation of the latter will cause a combination sliding and swinging movement of said slide rod.

4. A front wheel truck for trailers comprising: a transverse frame; a vertical pivot shaft at each extremity of said transverse frame; a caster wheel mounted on the lower extremity of each pivot shaft; a lever extending from each pivot shaft; a shock absorber vertically mounted adjacent each pivot shaft; a bracket member extending from the shaft of each shock absorber; a slide supported by each of said bracket members and extending radially of said absorber; a slide rod mounted in said slide; and a hinged connection between each of said slide rods and one of said levers so that rotation of the latter will cause a combination sliding and swinging movement of said slide rod, said lever being in alignment between the axis of said pivot shaft, said hinge, said slide, and the axis of said absorber when the wheels are in the straight-ahead position.

5. A front wheel truck for trailers comprising: a transverse frame; a vertical pivot shaft at each extremity of said transverse frame; a caster wheel mounted on the lower extremity of each pivot shaft; a lever extending from each pivot shaft; a shock absorber; a shaft projecting from and controlled by said shock absorber; and an arm member secured to and extending from said latter shaft to said lever, said arm being extensible to allow said lever to rotate through an arc of 360° and to convert said rotation into an oscillating movement of said shaft.

6. A front wheel truck for trailers comprising: a hinge pin; a first hinge member mounted on said hinge pin and secured to said trailer to maintain said pin rigidly parallel to the longitudinal axis of said trailer; a second hinge member mounted on said hinge pin; a front truck frame rigidly secured to said second hinge member so as to be maintained rigidly transverse of the axis of said trailer; caster wheels mounted between the two side extremities of said trailer frame; a towing tongue projecting forwardly from the middle front of said frame; and means for allowing said tongue to swing vertically with reference to said frame and for preventing relative sideward movement therebetween.

7. A front wheel truck for trailers comprising: a hinge pin; a first hinge member mounted on said hinge pin and secured to said trailer to maintain said pin rigidly parallel to the longitudinal axis of said trailer; a second hinge member mounted on said hinge pin; a front truck frame rigidly secured to said second hinge member so as to be maintained rigidly transverse of the axis of said trailer; caster wheels mounted between the two side extremities of said trailer frame; a towing tongue projecting forwardly from the middle front of said frame; means for allowing said tongue to swing vertically with reference to said frame and for preventing relative sideward movement therebetween.

8. A wheel mounting comprising: a frame member; a vertical pivot shaft mounted in said frame member; a caster wheel mounted on the lower extremity of said pivot shaft; a lever extending from said pivot shaft; a shock absorber carried by said frame member; a bracket member extending from the shaft of said shock absorber; a slide supported by said bracket member and extending radially of said absorber; a slide rod mounted in said slide; and a hinged connection between said slide rod and said lever so that rotation of the latter will cause a combination sliding and swinging movement of said slide rod.

9. A wheel mounting comprising: a frame member; a vertical pivot shaft mounted in said frame member; a caster wheel mounted on the lower extremity of said pivot shaft; a lever extending from said pivot shaft; a shock absorber; a shaft projecting from and controlled by said shock absorber; and an arm member secured to and extending from said latter shaft to said lever, said arm being extensible to allow said lever to rotate through an arc of 360° and to convert said rotation into an oscillating movement of said shaft.

10. A wheel mounting comprising: a frame member; a vertical pivot shaft mounted in said frame member; a caster wheel mounted on the lower extremity of said pivot shaft and to one side of the axis thereof; a lever extending from said pivot shaft; a shock absorber carried by said frame member and means for causing said shock absorber to exert its maximum absorbing action on said lever when said caster wheel is in the straight ahead position.

ERNEST C. McDANIEL.